F. J. BRADBERRY.
CLUTCH MECHANISM FOR GANG PLOW LIFTERS.
APPLICATION FILED APR. 26, 1911.
1,029,272.
Patented June 11, 1912.
2 SHEETS—SHEET 1.
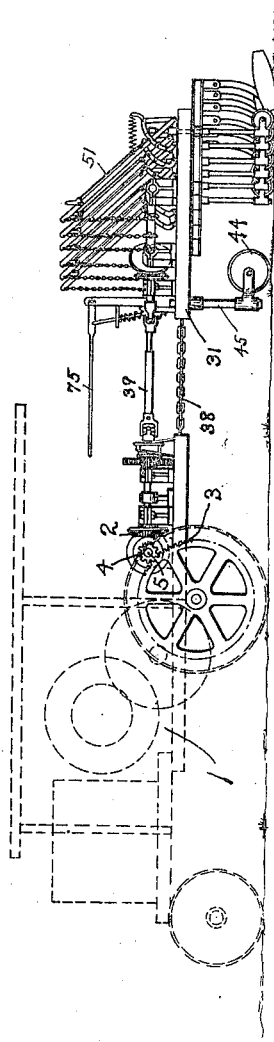
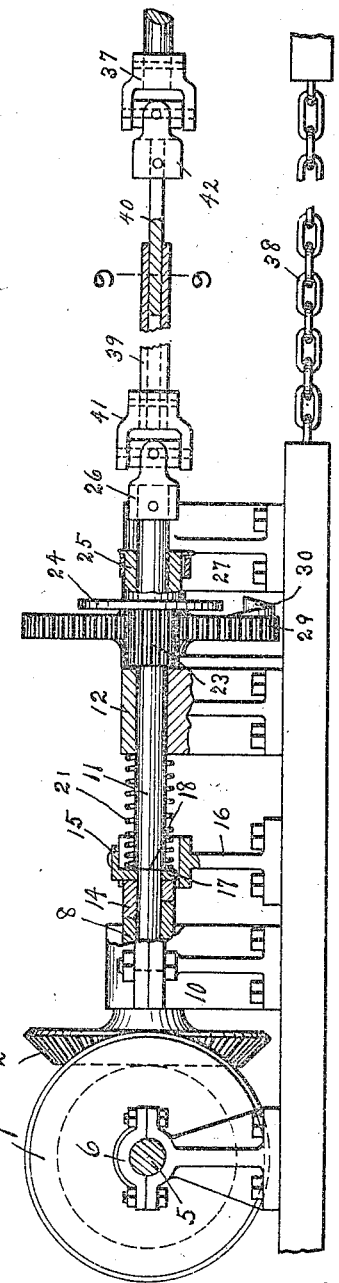
Witnesses
Albert A. Hofmann
E. M. Brown
Inventor
F. J. Bradberry
By Edward N. Pagelsen,
Attorney

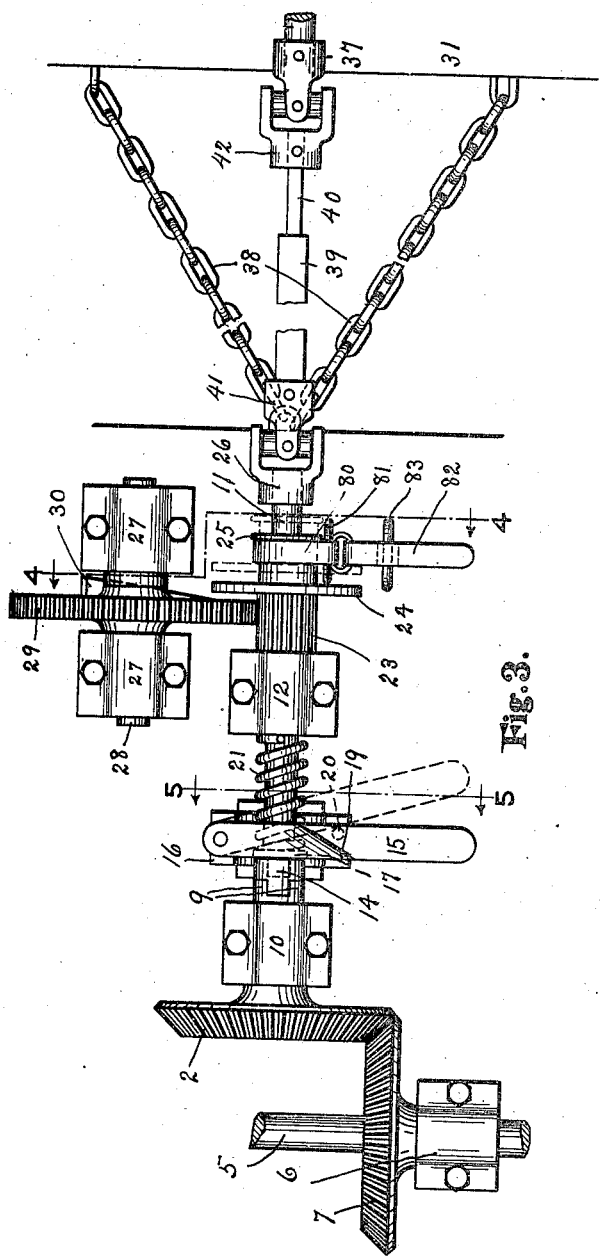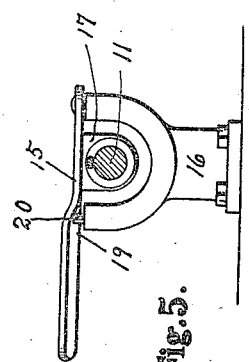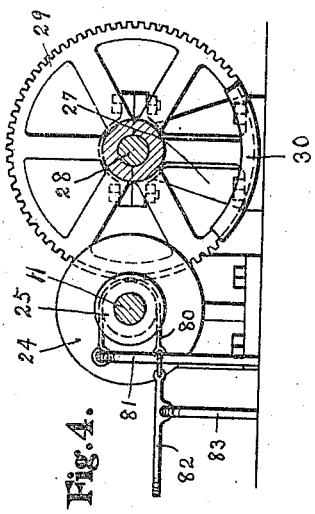

UNITED STATES PATENT OFFICE.

FREDERICK J. BRADBERRY, OF MITCHELL, SOUTH DAKOTA.

CLUTCH MECHANISM FOR GANG-PLOW LIFTERS.

1,029,272. Specification of Letters Patent. Patented June 11, 1912.

Application filed April 26, 1911. Serial No. 623,373.

*To all whom it may concern:*

Be it known that I, FREDERICK J. BRADBERRY, a citizen of the United States, and a resident of Mitchell, in the county of Davison and State of South Dakota, have invented a new and useful Clutch Mechanism for Gang-Plow Lifters, of which the following is a specification.

This invention relates to clutch mechanism for lifting and releasing gang plows and its object is to provide means whereby the engineer of the traction engine may control the plow lifting means and the plow releasing means without leaving the tractor.

In the accompanying drawings, Figure 1 is an elevation of the gang plow and a diagrammatic view of a tractor. Fig. 2 is a view partly in elevation and partly in section of the mechanism mounted on the tractor. Fig. 3 is a plan of the same. Figs. 4 and 5 are sections on the lines 4—4 and 5—5 of Fig. 3, respectively.

Similar reference characters refer to like parts throughout the several views.

In the use of gang plows drawn by steam or gasolene motors, an engineer is required to operate the tractor and a second operator to control the plows. The present construction is designed to avoid the necessity of having a plow operator, the plowing being controlled by the engineer of the tractor.

The plow platform, the operating levers, the self-castering gage wheels, and the construction of the tractor form no part of my present invention which is applicable to many designs of motor drawn gang plows.

The tractor 1 may be provided with any proper mechanism to drive the bevel gear 2, that shown being a main gear 3 connected to a driving shaft of the tractor, a pinion 4 meshing therewith and secured to the shaft 5, which shaft is mounted in bearings 6, carried by any desired portion of the tractor. In the drawings, this support is shown to be the main floor or platform of the tractor. On the shaft 5 is secured a bevel gear 7 which meshes with the bevel gear 2, which may therefore be considered as constantly running. This bevel gear 2 is preferably provided with a long sleeve 8 having clutch jaws 9, the sleeve being journaled in the bearing 10, furnishes a bearing for the front end of the shaft 11. This shaft is also journaled and slidable in the bearing 12. Secured to the front end of this shaft is a clutch member 14 adapted to engage the jaws 9 on the sleeve. A lever 15 is mounted on the pedestal 16 and has a flange 17, provided with an aperture to receive the shaft 11, and extending between the clutch member 14 and the shoulder 18 on the shaft 11. The lever is formed with an inclined edge 19 which is adapted to engage the pin 20 on the pedestal. A spring 21 between the flange 17 and the bearing 12 normally tends to force the shaft forward and the clutch members into engagement. When the shaft is pulled to the rear, the inclined edge 19 will ride up on the pin 20 until the lever reaches the position shown in dotted lines in Fig. 3, when it will fall back of this pin and hold the jaws from engaging. By lifting this lever the spring is permitted to force forward the shaft and clutch member 14. Secured to the shaft 11 are also the pinion 23, the disk 24, the brake drum 25 and the forward member 26 of a universal coupling. Mounted in bearings 27 is a shaft 28 carrying a gear 29 having a cam 30 mounted on it. The office of these members will be explained later on.

The gang-plow construction forms no part of this invention and is shown in the drawings as having a platform 31 supported at its front end by a wheel 44 at the lower end of a post 45. Between the tractor and plow platform are any desired flexible connectors 38, and between the universal coupling members 26 and 37 is an adjustable shaft, one member 39 of which is an angular sleeve in which is slidable the other member 40. The sleeve carries another member 41 of a universal coupling while a fourth member 42 is mounted on the rear end of the shaft 4. On the line 9—9 of Fig. 2, the two parts 39 and 40 will be square in cross section.

When it is desired to turn the shaft 30, the operator releases the lever 15 by kicking it up over the pin 20 and thus permitting the spring 21 to force the clutch member 14 into engagement with the jaws 9 on the sleeve 8 of the constantly running gear 2. The shaft 11 then revolves, turning the sleeve 39, and rod 40. The turning of the shaft 11 drives the gear 29. When the predetermined amount of revolution of the shaft 39 has been completed the cam 30 engages the disk 24 and moves it from the position shown by the solid lines to that in dotted lines in Fig. 3, sliding back the shaft 11 until the clutch member 14 disengages the jaws 9. This movement carries back the lever 15 to the position shown in dotted lines, when it is back of the pin 20 and so prevents the clutch from operating.

Many changes may be made in the details of construction without departing from the spirit of my invention.

Having now explained my construction, what I claim as my invention and desire to secure by Letters Patent is:—

1. The combination of a frame, a shaft revolubly mounted thereon, a revolving gear loosely mounted on the end thereof and having jaws on the inner end of its hub, a sleeve secured to said shaft and having jaws adapted to engage the jaws on the gear, a spring to force the jaws into engagement, a pinion and a disk secured to said shaft, a gear revolubly mounted adjacent the disk and in mesh with the pinion and having a cam on its side whereby the disk may be engaged and the shaft moved longitudinally to disengage said jaws, and means to lock said shaft and the jaws on the sleeve in inoperative position.

2. The combination of a platform, a bearing thereon, a driving gear and a hollow hub therefor revoluble in said bearing, said hub having clutch-jaws on its inner end, a second bearing, a shaft revoluble and slidable in said bearing and in said hub, a sleeve secured to said shaft and provided with clutch-jaws to engage those on said hub, a spring to force said jaws into engagement, a disk and a pinion secured to the shaft, a gear revolubly mounted in mesh with said pinion, a cam on said gear adapted to engage the disk and longitudinally move the shaft to disengage the clutch-jaws, and a locking device connected to said shaft to hold the clutch-jaws on the sleeve out of engagement with the jaws on the hub.

In testimony whereof I have signed this specification in the presence of two subscribing witnesses.

FREDERICK J. BRADBERRY.

Witnesses:
R. E. CONE,
O. B. WALLACK.